D. F. COMSTOCK & H. T. KALMUS.
SPEED MEASURING MACHINE.
APPLICATION FILED FEB. 10, 1909.
942,132.
Patented Dec. 7, 1909.
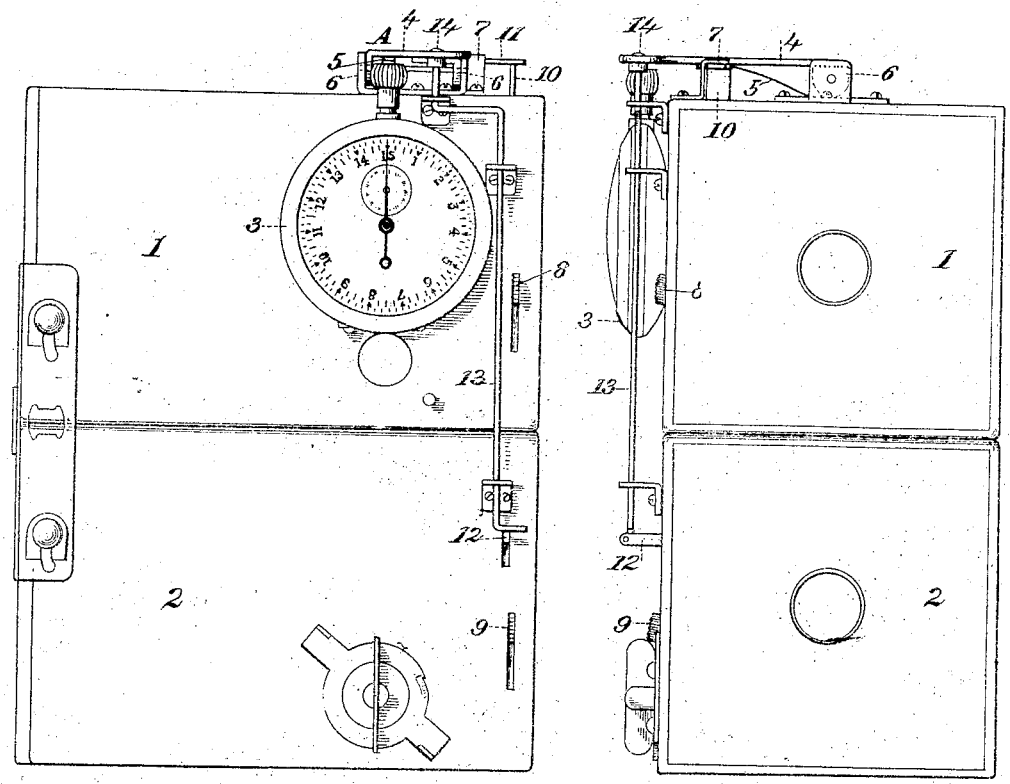
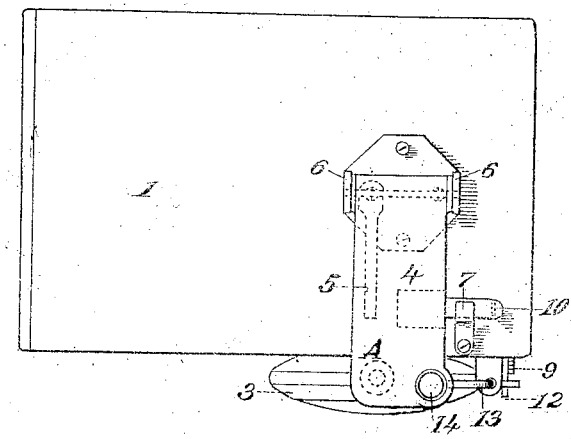

UNITED STATES PATENT OFFICE.

DANIEL F. COMSTOCK, OF BROOKLINE, AND HERBERT T. KALMUS, OF BOSTON, MASSACHUSETTS.

SPEED-MEASURING MACHINE.

942,132.  Specification of Letters Patent.  Patented Dec. 7, 1909.

Application filed February 10, 1909. Serial No. 477,124.

*To all whom it may concern:*

Be it known that we, DANIEL F. COMSTOCK and HERBERT T. KALMUS, citizens of the United States, residing, respectively, at Brookline and Boston, in the counties of Norfolk and Suffolk and State of Massachusetts, have invented certain new and useful Improvements in Speed-Measuring Machines; and we do hereby declare the following to be a full, clear, and exact description of the invention, such as will enable others skilled in the art to which it appertains to make and use the same.

The present invention relates to an improvement in speed measuring machines.

The object of the invention is to produce a machine by which the speed of a moving object can be determined. For example, the methods of measuring the speed of automobiles have been determined by pacing machines provided with speed indicators; by the taking of time by two observers at the ends of a measured stretch, one observer signaling to the other at the beginning of the time interval, as by dropping a handkerchief or an electric signal. The determination of automobile speeds by pacing them is not very satisfactory, especially as the determination of speed is dependent upon the reading of a speed indicating device by the person pacing the machine. The determination of the speed by timing on a measured stretch requires two men and the measuring of a stretch over the entire distance of which the machine must pass in order to secure a determination of the speed. Sometimes a machine will stop on the measured course, and then the speed cannot be determined.

According to the present invention two pictures are taken of the automobile as it retreats from the observer, and the time interval between is measured by a stop watch. The two pictures of the machine show a difference in the represented length of a certain part of the machine, for convenience the represented wheel gages may be taken or the represented lengths of the number plate. In any given part of the country the wheel gage is standard and affords one known measurement. In addition to this we have the focal length of the cameras. With these known quantities and the represented length of the wheel gage on the two pictures, it is a matter of elementary mensuration to compute the distance that the automobile travels between the time of taking the first picture and the time of taking the second picture. This distance, when compared with the elapsed time between the taking of the two pictures, readily gives the rate of speed of the automobile.

Of course the invention is not limited to use in connection with the use of measuring automobile speeds. It may be used for measuring the speed of other things.

The invention consists in the speed measuring apparatus hereinafter described and particularly defined in the claims.

In the accompanying drawings illustrating the preferred form of the invention Figure 1 is a side elevation, Fig. 2 a front elevation and Fig. 3 a plan of a speed measuring apparatus embodying the invention.

In the drawings there are represented two cameras, an upper camera 1 and lower camera 2, fastened together, and which, aside from the matters hereinafter pointed out, are constructed to operate in the ordinary way. To the upper camera is secured a stop watch 3 which is of the usual type of stop watches except that it is arranged to measure to 20th seconds. It is arranged with its stem projecting above the top of the upper camera. To the upper camera is pivoted a lever 4 which is normally supported in raised position by a spring 5. A standard for the lever 4 is indicated at 6. A stop 7 limits the upward movement of the lever 4. The shutters are set by the levers 8 and 9. The shutters are each provided with an escapement, the escapement 10 for the upper camera projecting up through the top of the camera and being engaged by a projection 11 from the lever 4, and the escapement lever 12 for the lower camera extending out through the side. A rod 13 mounted in guides on the sides of the cameras extends from the lower escapement lever 12 up to the operating lever 4, where it is provided with a head 14 which projects through a hole in the operating lever 4. The stem of the stop watch is located under the operating lever 4 and is adapted to be operated thereby.

In operation the observer noting the approach of an automobile, for example, the speed of which he desires to ascertain, allows it to pass him and thereupon he presses with his thumb on the operating lever at the place marked —A— thereby starting the stop watch and at the same time depressing the escapement 10 of the upper camera and taking a photograph of the object. After the lapse of a short interval of time he again depresses the operating lever 4, this time moving his thumb to a position over the head 14 of the rod 13 so that when he now depresses the operating lever he stops the stop watch and at the same time depresses the rod 13 and thereby simultaneously releases the escapement 12 on the second camera 2 and takes a second picture of the object. The observer should then write down the number of the film in each camera and the time indicated by the stop watch as the interval between the taking of the two pictures. Upon development of the films the represented length of the wheel gages in the two pictures may be measured. Then substituting the known values in the following equation the distance traveled by the automobile is readily computed. In this equation D is the distance traveled by the automobile between the taking of the two pictures, $f$ the focal length of the cameras, G the wheel gage of the automobile (ordinarily four feet nine inches,) $g$ the represented length of the wheel gage measured on the first film, and $g'$ is the represented wheel gage measured on the second film. Thus $$D = fG\left(\frac{g-g'}{gg'}\right)$$

Of course all measurements must be expressed in the same units. Having ascertained the distance traveled by the automobile between the taking of the pictures and knowing the time interval, the speed is readily determined.

The specific embodiment of the invention, or the specific use to which it is to be put, is a matter of no moment, as the invention may readily be embodied in other forms without departure therefrom or the exercise of more skill than that of a person familiar with the construction of such apparatus.

Having thus described the invention what is claimed is:—

1. A speed measuring apparatus, having, in combination, two picture making apparatuses, a stop watch, and connections between the stop watch and the picture making apparatuses operating to cause one of the picture making apparatuses to take a picture upon the starting of the stop watch and to cause the other picture making apparatus to take a picture upon the stopping of the stop watch, substantially as described.

2. A speed measuring apparatus, having, in combination, two cameras each provided with shutters and escapements, a stop watch and connections between the stop watch and the escapements of the cameras having provision for releasing the escapement of one camera on the starting of the stop watch and for releasing the escapement of the other camera on the stopping of the stop watch, substantially as described.

3. A speed measuring apparatus, having, in combination, two picture making devices, a time interval measuring device, and connections between the devices operating to cause one of the picture making devices to take a picture at the beginning of the measured time interval and to cause the other picture making device to take a picture at the end of the measured time interval, substantially as described.

4. A speed measuring device, having, in combination, means for taking two pictures and for determining the time interval between, substantially as described.

In testimony whereof we affix our signatures, in presence of two witnesses.

DANIEL F. COMSTOCK.
HERBERT T. KALMUS.

Witnesses:
  HORACE VAN EVEREN,
  ALICE ACKROYD.